United States Patent [19]

Adcock

[11] Patent Number: 5,604,797
[45] Date of Patent: Feb. 18, 1997

[54] RING-TONE MUTING DEVICE AND PROCESSING METHOD

[76] Inventor: Stanley J. Adcock, 518 Whitnell Ave., Murray, Ky. 42071

[21] Appl. No.: 574,655

[22] Filed: Dec. 19, 1995

[51] Int. Cl.⁶ ................................................ H04M 1/66
[52] U.S. Cl. .................. 379/373; 379/199; 379/376; 379/377; 379/421
[58] Field of Search ................................. 379/372, 373, 379/374, 375, 376, 377, 421, 252, 253, 164, 263, 82, 188, 189, 199

[56] References Cited

U.S. PATENT DOCUMENTS

| | | | |
|---|---|---|---|
| 4,065,642 | 12/1977 | McClure | 379/77 |
| 4,074,081 | 2/1978 | Humm | 379/373 |
| 4,891,834 | 1/1990 | Sezaki et al. | 379/67 |
| 4,937,854 | 6/1990 | Sarakas | 379/199 |
| 5,157,712 | 10/1992 | Wallen, Jr. | 379/74 |
| 5,191,607 | 3/1993 | Meyers et al. | 379/421 |
| 5,317,632 | 5/1994 | Ellison | 379/199 |
| 5,351,289 | 9/1994 | Logsdon et al. | 379/142 |

FOREIGN PATENT DOCUMENTS

| | | |
|---|---|---|
| 0559047 | 9/1993 | European Pat. Off. . |
| 1-177246 | 7/1989 | Japan . |
| 1-255348 | 10/1989 | Japan . |

*Primary Examiner*—Thomas W. Brown
*Assistant Examiner*—Jacques M. Saint-Surin
*Attorney, Agent, or Firm*—Richard C. Litman

[57] ABSTRACT

A device for muting a ringer of a telephone, the device being placed in series with a telephone ringer and having a gate alterable between a non-conductive state and a conductive state whereby a ring signal is selectively passed to the ringer. A remote calling party may activate the conductive state by sending a first and last ring signal separated by a preselected time interval, dependent upon the selected mode of the device. The device includes a gate controlled by output signals from a pair of interactive timing mechanisms, referred to as a delay timer and a window timer. In a first ring mode, the delay timer is activated by a remotely generated first ring signal and disregards all subsequent ring signals during completion of its timing sequence (the delay sequence). In a last ring mode, the delay timer is restarted upon receiving each ring signal, thus completing the delay sequence only after the last ring signal is received. When the power to the device is turned on, the device is initialized wherein the gate is placed into a non-conductive state preventing conduction of the ring signal to the ringer, thereby silencing the ringer. Thus, until the delay timer subsequently completes a time sequence (the delay sequence), the ringer remains disabled, the gate being in a non-conductive state. However, upon completion of the delay sequence, the delay time activates a window timer which places the gate into a conductive state (ring enabled).

16 Claims, 7 Drawing Sheets

RING-TONE MUTING DEVICE AND PROCESSING METHOD

BACKGROUND OF THE INVENTION

1. Field of the Invention

The present invention relates to a device for muting a ringer of a telephone, more particularly, a device placed in series with a telephone ringer and having a gate alterable between a non-conductive state and a conductive state whereby a ring signal is selectively passed to the ringer. A remote calling party may activate the conductive state of the gate by sending a first and last ring signal separated by a preselected time interval and dependent upon the selected mode of the device at the terminal telephone.

2. Description of the Prior Art

The present invention primarily addresses a problem that many people who work at night and sleep during others' waking hours face, namely, daytime telephone calls. Each telephone call sets off a ringer which can disturb the sleeping called party. Yet, if the called party simply shuts off the telephone ringer, the called party isolates himself or herself from desired telephone calls.

Various solutions to screen disturbing or undesirable incoming phone calls and mute the ring-tone can be found in the prior art. Each of these solutions rely on recognition by the screening device of a code which must be known to the calling party. Often, in order to ring the telephone, the calling party must enter a specific code which activates the receiving telephone ringer. However, the systems used to recognize the code differ from one to another.

For example, a system based in dual tone multi-frequency recognition (DTMF or touch tones) is provided by U.S. Pat. No. 5,157,712 issued Oct. 20, 1992 to Wallen, Jr. It describes a device which instructs a calling party to manually enter a touch-tone code after a first tone is produced. If the code is properly provided, the terminal telephone rings; otherwise, only a message is taken. The use of a touch-tone recognition device to activate a ringer is inapplicable to the present invention.

U.S. Pat. No. 4,937,854 issued Jun. 6, 1990 to Sarakas describes a call screening device to avoid unwanted phone calls wherein the calling party must also use DTMF signals to enter a requested security code to activate and deactivate the device remotely. The '854 patent also teaches away from the present invention because the device is intended for use on a network of telephones, wherein, when the correct security code is entered, the device activates a ringing circuit to all telephones on the network.

U.S. Pat. No. 4,891,834 issued Jan. 2, 1990 to Sezaki et al. describes a telephone capable of being switched between its ordinary function and a "message function" for recording confidential messages by using the proper code. The telephone uses a ring signal identification circuit in series between the incoming ring signal and a terminal telephone and counts a predetermined number of ring signals without ringing the terminal telephone's ringer. If a calling party privy to the proper code once disconnects the call and originates a second call within a predetermined time interval timed by a counter within the device, the device requests an identifying multi-frequency signal password, and thereupon changes the condition of the telephone from its ordinary to message function. The timing logic circuit used in the counter counts the number of ring pulses; i.e., the subsequent timing operation of the '834 device necessarily depends upon the timing logic circuit to count the number of ring signal pulses by sensing the number of continuous 16 Hz ½ second signals received before sending any signal to the telephone or ringer. Moreover, the calling party controls the message function and not the ringer, which function can be accessed only by a calling or receiving party with the proper DTMF code.

Japanese publication No. 1-255348 published Oct. 12, 1989 by Inoue describes a telephone call screening device which prevents a ringer from being sounded. When a call is received by the device, a count-up is executed by a counter, which then compares the frequency of rings (i.e. number of rings) to a preset frequency figure.

Japanese publication No. 1-177246 published Jul. 13, 1989 by Nakagawa describes a telephone system having caller-selected functions which allow the calling party to reach a receiving telephone without knowing a code number. A translated abstract of the publication describes a switch circuit which produces a "fixed time action condition when calling signals dissipate after the prescribed number of calling signals arrive". Subsequently, if a second call signal is received while the "fixed time action condition" is active, a second action condition is produced by a "first calling signal generating circuit". An audible sound is then generated by these circuits. The logic appears to significantly differ from the present invention.

Other means to silence telephone ringers are also known; however, these fail to allow a calling party to activate the device. For example, U.S. Pat. No. 5,317,632 issued May 31, 1994 to Ellison describes a simple timer for selectively disabling a telephone ringer for a selected time period. The called party simply turns a mechanical selector knob to set a quartz clock which counts down, during which time the telephone ringer is silent. U.S. Pat. No. 5,351,289 issued Sep. 27, 1994 to Logsdon et al. describes a "caller ID" circuit logic to automatically block calls originating from particular telephone numbers. The system is also not capable of being remotely activated to allow passage of a ring signal. European Patent Application No. 0 559 047 by Inglehart published Sep. 8, 1993 also describes an apparatus that blocks a telephone ringer when receiving calls from a designated telephone number.

U.S. Pat. No. 5,191,607 issued Mar. 2, 1993 to Meyers et al. describes a ring-tone muting device controlled by an operator in high-stress communications operations when the operator has the need to eliminate background noise. A timer prevents indefinite or permanent muting by automatically disabling a ring-tone mute circuit after a programmable period of time has passed from when the operator manually muted the ring-tone. A visual reminder is provided while the ringing is muted.

U.S. Pat. No. 4,065,642 issued Dec. 27, 1977 to McClure describes an answering/messaging system for automatically sensing and signaling the presence of a message, by means of automatic and repetitive dial and paging features. The device includes a timing feature which merely discontinues dialing if a remotely dialed location does not answer.

None of the above inventions and patents, taken either singly or in combination, is seen to describe the instant invention as claimed.

SUMMARY OF THE INVENTION

The present invention relates to a device for muting a ringer of a telephone, more particularly, a device placed in series with a telephone ringer and having a gate alterable between a non-conductive state and a conductive state whereby a ring signal is selectively passed to the ringer. A remote calling party may activate the conductive state of the gate by sending a first and last ring signal separated by a preselected time interval dependent upon the selected mode of the device.

The ring-muting device is placed in series between an incoming telephone line and any telecommunications signal receiving device, such as a telephone, facsimile machine, personal computer, etc., and controls the activation of the telecommunication devices's ringer mechanism. For clarity and simplicity of discussion, the present invention will be discussed primarily in reference to connection with a telephone having a ringer which is thereby selectively silenced.

The present invention includes a gate ultimately controlled by output signals from a pair of interactive timing mechanisms, referred to herein as a delay timer and a window timer. The delay timer may have multiple modes from which the called party may select. The preferred embodiment of the present invention is powered by an 12 V DC power source; however, the device may be adapted for use with other power sources.

In the preferred embodiment, the called party can select either a first ring mode or a last ring mode. In the first ring mode, the delay timer is activated by a remotely generated first ring signal; all subsequent ring signals during completion of its timing sequence (the delay sequence) are disregarded. In the last ring mode, the delay timer is restarted upon receiving each ring signal; thus, the delay sequence is completed only after the last ring signal is received. When the power to the device is turned on, the device is initialized wherein the gate is placed into a non-conductive state preventing conduction of the ring signal to the ringer, thereby silencing the ringer. Thus, until the delay timer subsequently completes a time sequence (the delay sequence), the ringer remains disabled, the gate being in a non-conductive state. However, upon completion of the delay sequence, the delay timer activates a window timer which places the gate into a conductive state (ring enabled). The window timer subsequently also completes a time sequence (the window sequence) during which the ringer remains enabled, the gate being in a conductive state. Should a ring signal from a call be received during the window sequence, the ring signal causes the ringer to sound.

Dependent upon the mode chosen, the time window is generated at different times, which obtains different results. In each of the two following examples, a remotely placed telephone ring signal is allowed to continue without interruption, ordinarily causing the terminal telephone to ring continuously. With the device in place and with the last-ring mode chosen, the continuous ring signal never causes the delay timer to generate an output signal to activate the window timer because the delay timer is continually restarted. Thus the delay sequence is never completed, and so the ringer is continuously silent regardless of the length of the uninterrupted call.

However, if the first-ring mode has been chosen by the called party and a calling party subsequently places the same single, uninterrupted call, the ring signal will eventually be passed through and sound the ringer. The first pulse of the ring signal causes the delay sequence to begin. The gate, having been initialized, is in a non-conductive state. Therefore, although the calling party allows the remotely generated ring signal to continue, the ringer is disabled during the delay sequence. Eventually, however, the delay sequence expires and the window timer is activated, thereby activating a conductive state allowing the ringer to sound.

By comparing the outcomes it becomes apparent that, when the last-ring mode is chosen, a calling party must first discontinue a call and wait the proper period of elapsed time before placing a second call in order to pass the gate at the proper time. In the alternative, when the first-ring mode is chosen, a calling party can either be persistent and allow the phone to ring beyond the expiration of the delay sequence or call again after the appropriate time interval to pass through the gate. The device provides a means by which the delay and window sequence duration may be selectively changed by the called party.

Although for sake of clarity and simplicity of discussion the preferred embodiment as discussed herein refers to the present invention connected with a telephone having a ringer which is thereby selectively silenced, it should be understood that several other benefits can be achieved when connected with other telecommunications devices.

For example, the present invention can be used as an access control or effectively hide the presence of a fax machine or personal computer. Most personal computers and fax machines will announce themselves after a selected number of ring signals are counted (as do answering machines). However, the present invention selectively blocks the incoming signal so that the fax or personal computer does not answer. However, should the caller want to gain entry having knowledge of the proper activation sequence, the present invention allows the devices to operate normally after the delay sequence expires.

Accordingly, it is a principal object of the invention to provide a ring-muting device which operationally enables and disables a telecommunications device ring signal receiver, dependent on the timing differential between two remotely generated ring signals passing through a gate in series with the ringer.

It is another object of the invention to provide circuit logic and processing method for a ring-muting device having a delay timing sequence coincident with a non-conductive, disabled state of the gate and a window timing sequence coincident with a conductive, enabled state of the gate.

It is a further object of the invention to provide a ring-muting device having various modes of operation which enable variable timing of conductive states.

Still another object of the invention is to provide a ring-muting device having means by which a called party can selectively alter the length of the delay sequence and window sequence.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to a device for muting a ring signal receiver or ringer of a telephone or other telecommunications receiving device. The present invention is placed in series with a ringer and has a gate alterable between a non-conductive state and a conductive state whereby a ring signal is selectively passed to the ringer. A remote calling party may activate the conductive state of the gate by sending a first and last ring signal separated by a preselected time interval and dependent upon the selected mode of the device at the terminal telephone.

Figure 1:
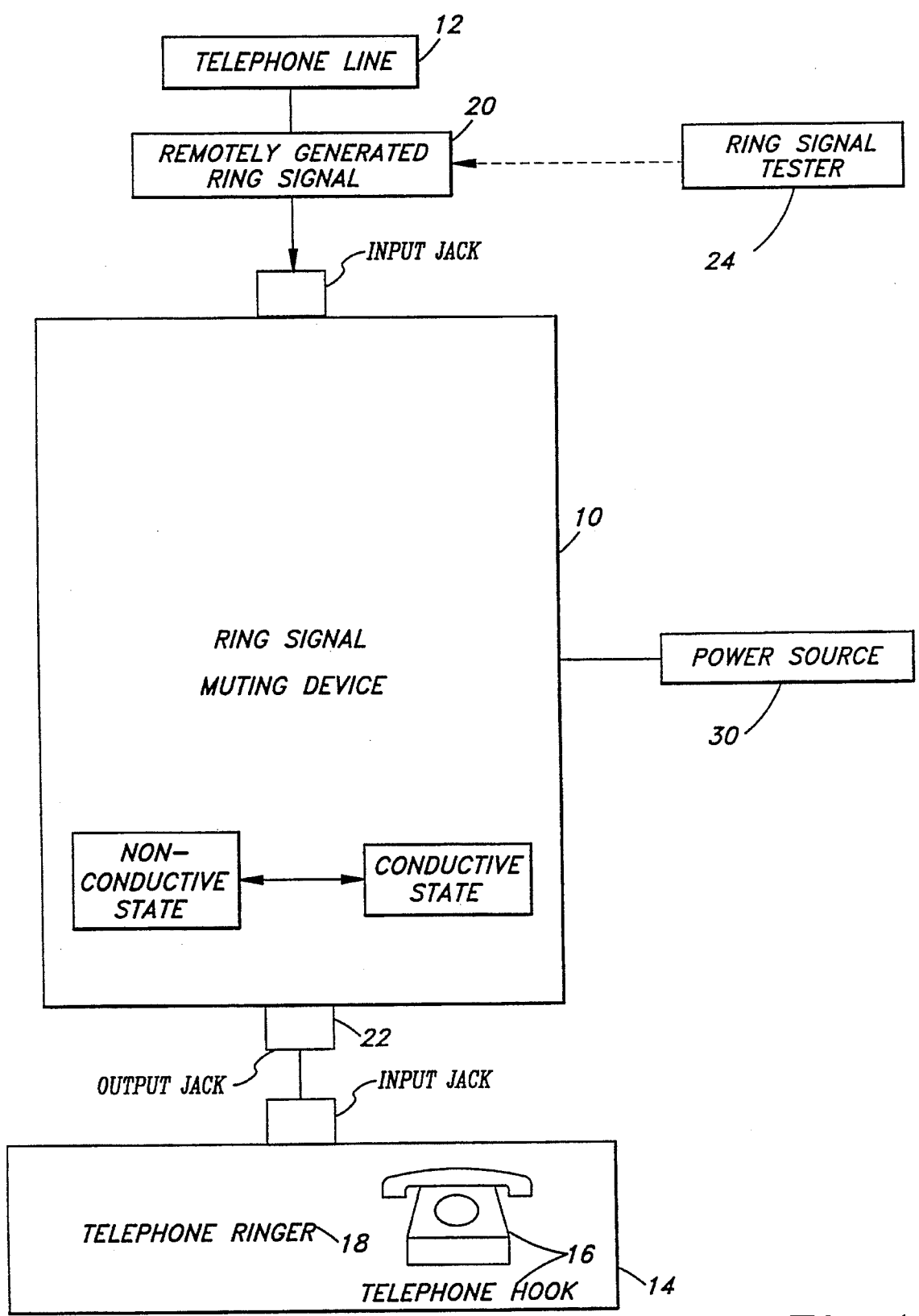
FIG. 1 is an overview block diagram of a telephone system using the ring-muting device.
Figure 2A:
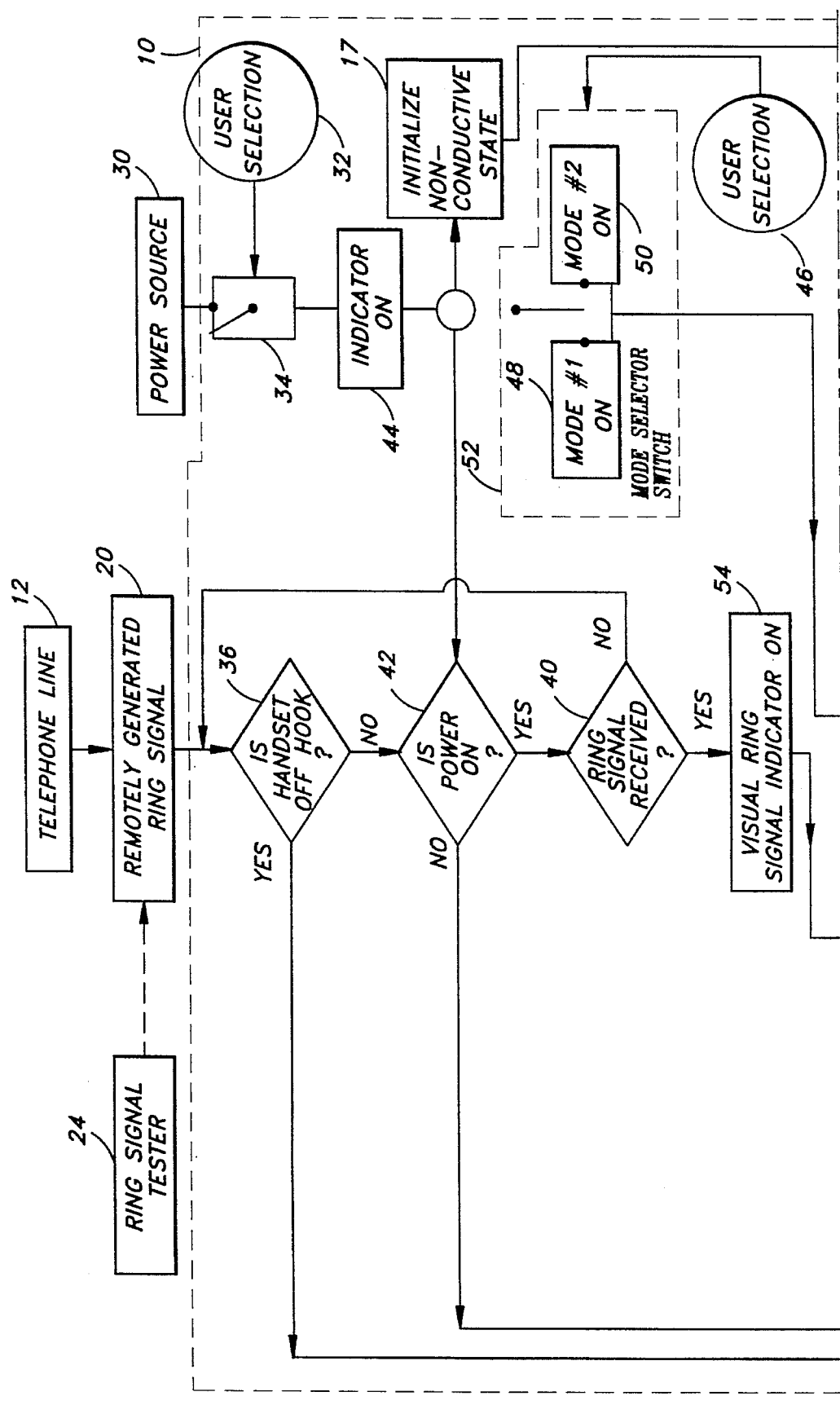
FIGS. 2A, 2B, 2C and 2D are successive portions of a block diagram of the circuit logic of the ring-muting device.
Figure 2B:
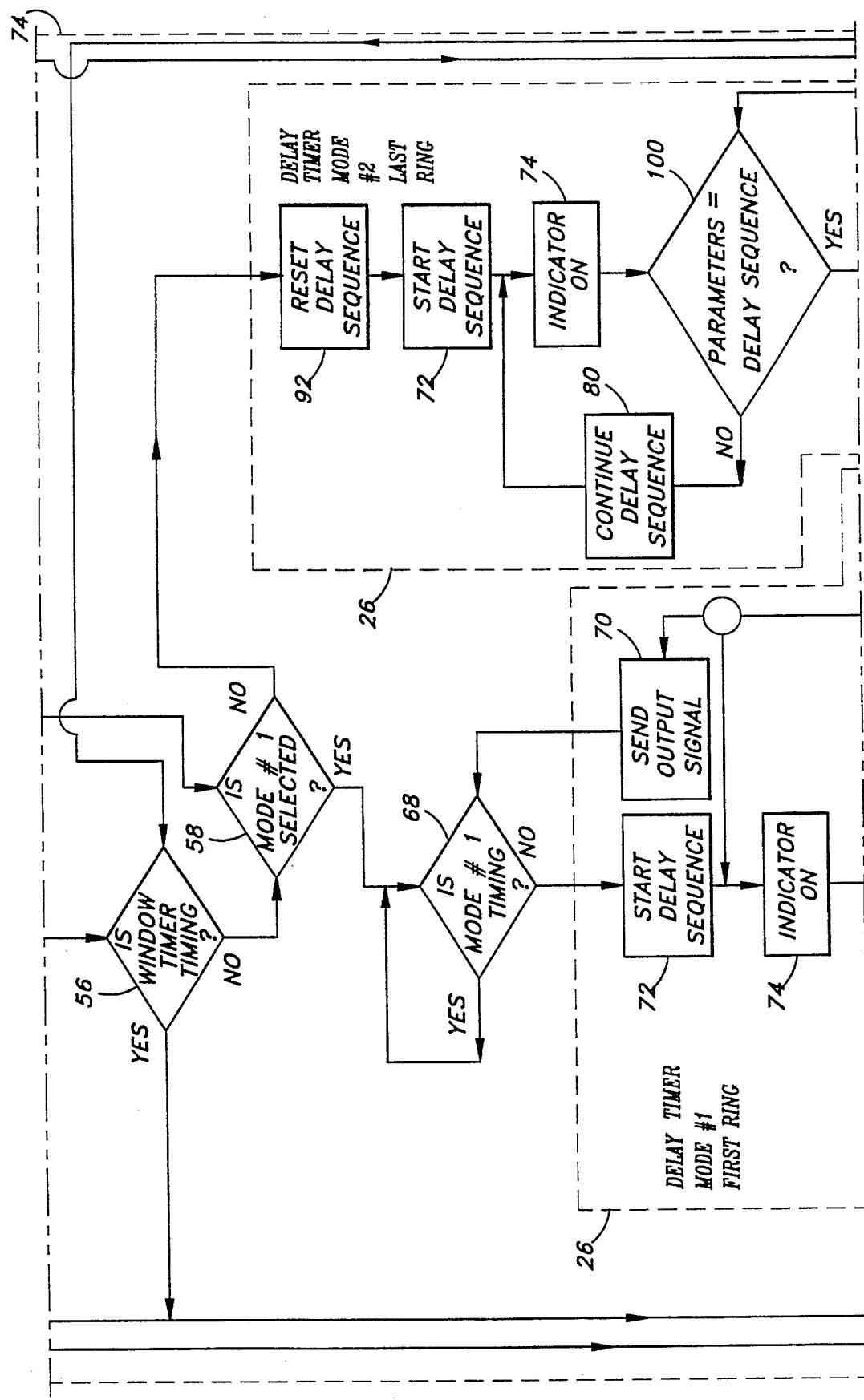
Figure 2C:
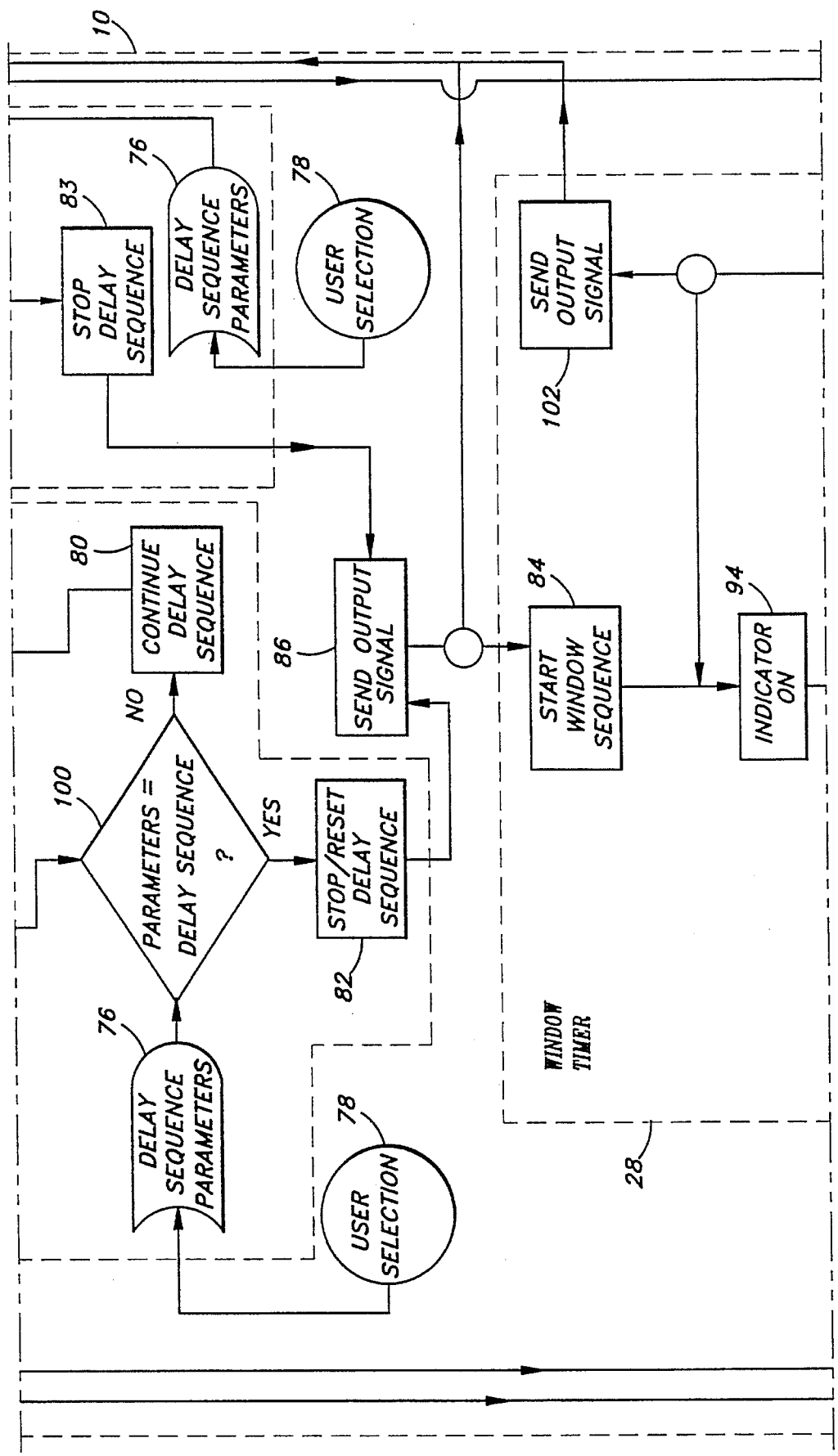
Figure 2D:
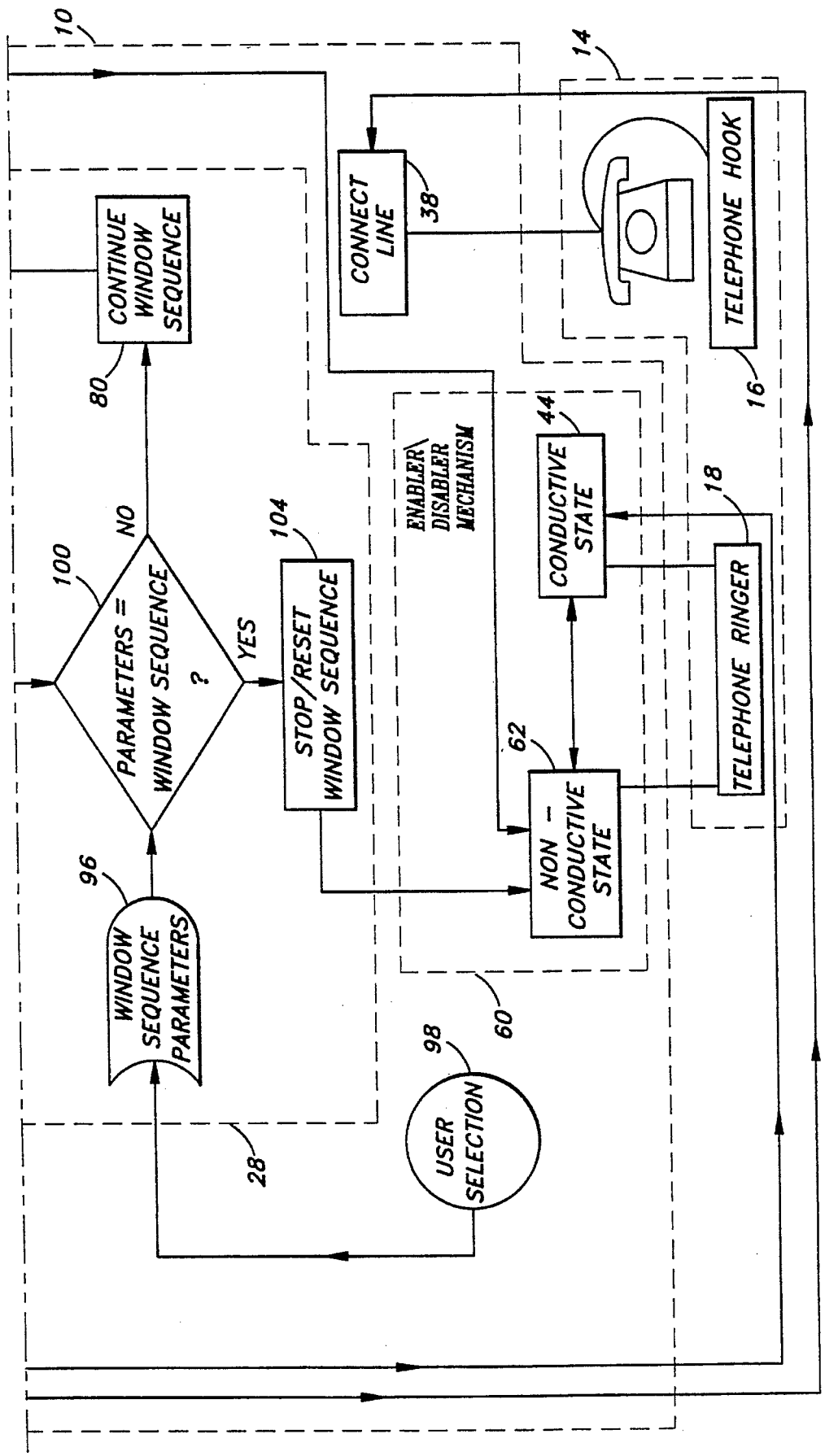

The block diagram in FIG. 1 introduces the functional relationships between the ring-muting device 10 and a telephone system. In background, a dial tone in a typical unaltered telephone system is generated by a direct current which travels over a positive and negative line of a telephone line 12. The line 12 directly inputs to a jack of a telephone 14, which jack attaches each the positive and the negative line to a respective positive and negative terminal of the telephone 14. A remotely generated ring signal 20 travels over the telephone line 12 when a call is placed by a calling party. This ring signal 20 is an approximately 90 V AC pulse, which voltage is sent across the terminals of the telephone 14 to activate a ringer 18 in the telephone. When the handset of the telephone 14 is removed by the called party, the hookswitch 16 bypasses and deactivates the ringer 18, connecting the call.

As shown in FIG. 1, the ring signal muting device 10 is placed in series between the telephone line 12 and a single telephone 14. The ring-muting device 10 is powered by a power source 30 (12 V DC) and, when on, only the ringer 18 in series with the ring signal muting device 10 is silenced. The device 10 has no effect on other telephones which may be attached to the same telephone line 12.

FIGS. 2A, 2B, 2C and 2D represent the essence of the invention, namely the circuit logic of the ring-muting device 10. The first decision block 36 represents a circuit within the device 10 which determines whether the telephone handset has been taken off the hook 16 and, if so, results in the bypass connection of the telephone and telephone line in the ordinary manner (block 38). With the handset on-hook, decision block 42 represents a circuit which determines whether the device 10 is on or off.

To power the device 10, a user turns on (user selection 32) a power on/off switch 34. When the switch 34 is in its open position (OFF) and the ring signal 20 arrives, the gate 60 (enabler/disabler mechanism) remains in a conductive state 44 thus allowing the ring signal 20 to sound the ringer 18. Turning the switch 34 to the ON position provides power to the circuit and the gate 60 may be initialized 17 by placing it into a non-conductive state 62. An indicator 44 may also be included in the device to indicate an ON status.

However, when the switch 34 is in its closed position (ON) and the ring signal 20 arrives, the circuit logic coordinates a pair of timing mechanisms, a delay timer 26 and a window timer 28. The next decision block 40 represents a circuit which senses the ring signal 20 and activates the timing mechanisms of the device 10. Moreover, when each incoming ring signal is received by the device 10, a visual ring indicator 54 is activated with each ring signal pulse to allow a called party to see, rather than hear, the incoming ring signal 20. When the called party observes the visual ring indicator 54, the called party can choose to answer an incoming call by lifting the handset, causing a bypass circuit designated by block 36 to allow the call to be connected.

It should be noted that the calling party is unable to distinguish whether the caller is blocking the audible ring signal and the effects as observed by the calling party appear normal. The device is therefore virtually undetectable when the ring-pulse travels to the receiving telephone.

Having sensed the ring signal and if the call is not connected, the circuit logic must determine the instant operational status of the device 10. As detailed ahead, if a window timer 28 has been activated, it will complete a window sequence during which period the gate 60 is in a conductive state 44. Decision block 56 represents the circuit which allows each ring signal 20 received during the activation of the window timer 28 to be passed through the gate 60 in its conductive state 44. Should a ring signal from a call be received during the window sequence, the ring signal causes the ringer 18 to sound.

If the window timer 28 is not timing at this point in the logic circuit, the device 10 establishes (decision block 58) in which of two modes of operation the delay timer circuit is operating. In the preferred embodiment, a mode selector switch 52 allows the called party to select (user selection block 46) either a first ring mode 48 or a last ring mode 50 provided by one or more delay timers 26. This information is input into decision block 58. As discussed in more detail below, activation of either delay timer 26 causes a delay sequence to be started, during which the gate 60 remains in a non-conductive state 62 (silent).

The delay timer 26 in mode #1 48 is activated by the first remotely generated ring signal 20 of a call and disregards all subsequent ring signals during the timing of a delay sequence. The delay timer 26 in mode #2 50 is restarted upon each ring signal received and completes the delay sequence after the last ring signal.

Figure 3:
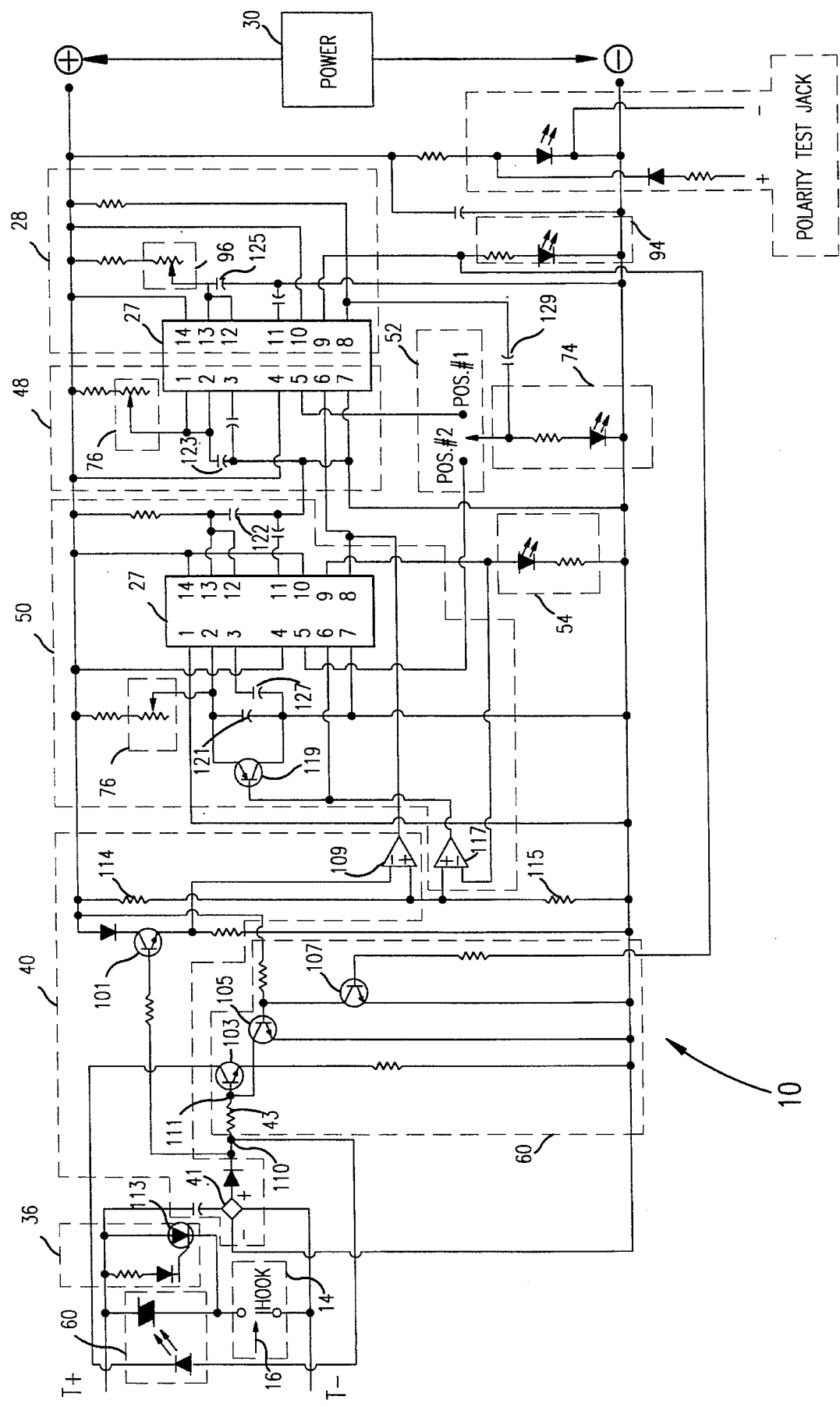
FIG. 3 is a schematic diagram including the timing circuits of a first embodiment of the ring-muting device.
Figure 4:
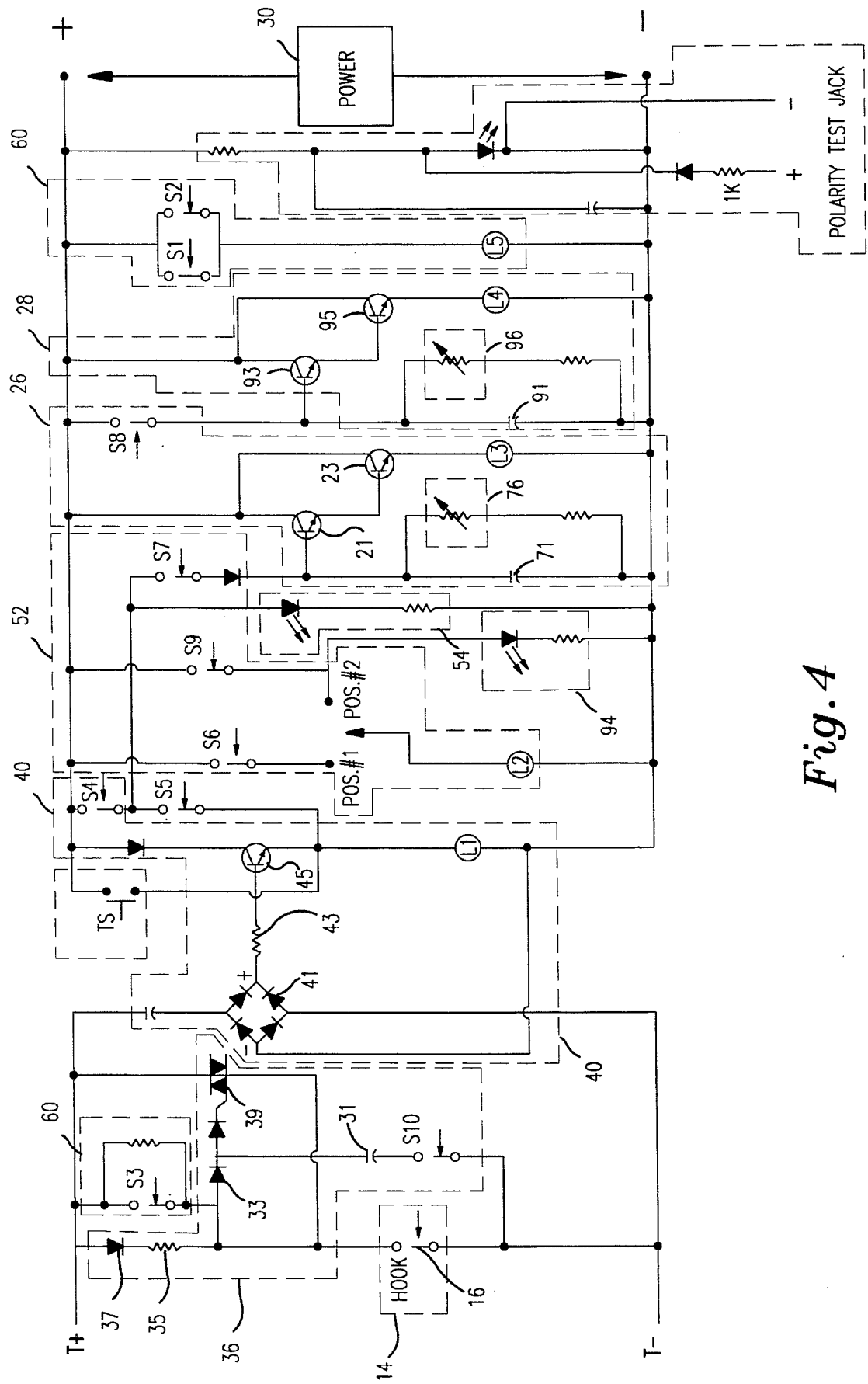
FIG. 4 is a schematic diagram including the timing circuits of a second embodiment of the ring-muting device.

It is noted that, although in the preferred embodiment the mode selector switch 52 is placed before the delay timers 26, one may easily conceive alternative embodiments, such as one having the mode selector switch 52 after the delay timers 26 as shown in FIG. 3. In such a construction, both delay timers 26 are activated by a ring signal sensing circuit 40, but only one of the timers is subsequently connected to the window timer 28. Moreover, although the modes 48,50 are shown embodied in two separate delay timers 26,26, the mechanism by which the delay sequences can be achieved is to be understood not to be limited to the use of separate delay timers; for example, the modes may be embodied in a single delay timing circuit as shown in FIG. 4.

Nevertheless, in the preferred embodiment as shown in FIG. 2 and at this point in the circuit logic, decision block 58 causes one of the two alternative mode pathways to be followed. If mode #1 48 was selected, decision block 68 determines the timing status of the mode #1 delay timer 26. If a first ring signal 20 has already activated the delay timer 26, output 70 from the delay timer is being received by the circuit represented by decision block 68. Subsequent ring signals neither alter the delay sequence nor change the state of gate 60, which being in its non-conductive state 62 blocks the ring signal 20.

If the mode #1 delay timer is not timing, the ring signal 20 starts the delay sequence 72 and activates an indicator 74 which remains ON until the delay sequence expires. Moreover, as previously noted, no change to the state of gate 60 is caused, which being in its non-conductive state 62 blocks the ring signal 20. The delay sequence expires when the delay sequence parameters 76 are met. The device 10 is provided with a means by which a called party may select (user selection block 78) desired delay sequence parameters 76 for the delay sequence.

For example, the called party may wish the delay sequence to end two minutes after the first ring signal was received. The user thus inputs the desired delay sequence parameter 76, whereupon the delay timer 26 will match the parameter to the delay sequence (decision block 100). The sequence will otherwise continue (block 80) and send output signals 70 until the parameter is met, whereupon the delay timer 26 is stopped and the delay sequence is also reset (block 82). An output signal 86 starts the window sequence 84 of the window timer 28, which inputs at decision block 56 and changes the gate 60 from the non-conductive 62 to a conductive state 44 (ring enabled).

As suggested previously, generation of the time window is dependent on the mode chosen. Referring back to decision block 58, if mode #1 has not been chosen, then mode #2 50 is on. Unlike mode #1, each ring signal 20 does alter the delay sequence by resetting the delay sequence 92 and then restarting the delay sequence 72, which also activates an indicator 74 which remains ON until the delay sequence expires. Thus each ring signal 20 restarts the delay sequence.

As previously discussed with regard to mode #1 and in similar manner, the delay sequence expires when the delay sequence parameters 76 are met. The sequence will otherwise continue (block 80) until the parameter is met, whereupon the delay timer 26 is stopped (block 83).

However, because the delay sequence is restarted so long as a ring signal is received, the output signal 86 will not be sent to the gate 60 to change the state from the non-conductive 62 to a conductive state 44 (ring enabled) until the preset period of time passes without interruption by a ring signal.

The output signal 86 starts the window sequence 84 and inputs at decision block 56, allowing subsequent ring signals to be conducted to the ringer 18. An indicator 94 remains ON until the window sequence expires. The window sequence expires when the window sequence parameters 96 are met. The device 10 is provided with a means by which a called party may select (user selection block 98) desired window sequence parameters 96. When the parameters match the delay sequence (decision block 100), the window sequence is terminated (block 104). Otherwise, the window sequence continues (block 80) and output signals 102 are sent to decision block 56 until the parameters are met. When window timer 28 stops, the window sequence is reset (block 104), and the state of gate 60 is changed from the conductive 44 to non-conductive state 62 (ring disabled).

The device is then again ready to receive a new series of incoming ring signals.

It is also noted that a plurality of modes, other than the two described or in addition to the two described, may be installed which provide an activation of the window timer at intermediate points. For example, a mode may be used wherein a variable number of rings in a sequence is counted which then activates the timer. The inventive distinction with the prior art remains; once the rings are counted, the delay sequence is again timed without regard to the number of subsequent rings or calls placed and the timers operate successively. Moreover, any number of delay timers may be installed in series with the window timer resulting in an infinite number of combinations.

Also, although the preferred embodiments of the device 10 are shown hard-wired by output and input telephone jacks 22 to the telephone line 12 and telephone 14, the device 10 may be adapted to accommodate in series telecommunications devices known in the prior art which allow a remotely generated ring signal to be received, such as cordless, mobile, or cellular telephone devices. Moreover, the device 10 may be miniaturized to allow it to fit within a housing of the telephone 14.

As an optional feature in combination with the device 10, a ring signal test circuit 24 can be included to assist the user in establishing that the device has been properly installed in series. In alternative embodiments of the invention as shown in FIG. 3 and FIG. 4, this tester may be a standard polarity test circuit accessible by a standard jack included in the device 10. However, other embodiments of the present invention to which the discussed logic applies are possible wherein the device 10 is not polarity sensitive, and a tester would not be necessary. An optional test switch TS is also shown for testing proper operation of the device after installation.

Moreover, it is again noted that the device 10 can be used as an access control device for computer modems, facsimile machines and other such devices known in the prior art which receive ring signals.

FIG. 3 and FIG. 4 show schematic diagrams of two embodiments of the ring-muting device 10 represented by FIGS. 1 and 2A, 2B, 2C, and 2D. FIG. 3 shows a schematic using standard and commercially available electronic components, such as integrated circuit chips. FIG. 4 shows a schematic using standard and commercially available relay components. Circuits in FIG. 3 and FIG. 4 are identified whenever possible by the number corresponding to the associated logic block previously identified in FIG. 2. The description of the logic block may hereinafter be noted parenthetically after the circuit number for sake of convenience and clarity.

In both schematics, device 10 is connected across both a positive and negative terminal to power source 30. A positive (T+) and a negative (T−) terminal represent the telephone line 12 connection to the device 10. Block 14 represents the telephone, having a hookswitch 16, represented by movable relay switch contact points (hereinafter contacts) in a normally open position or on-hook condition, and a ringer 18 (not shown).

Beginning with FIG. 4, when power 30 is turned on, the circuit energizes the ring signal sensor circuit 40 (represented by ring signal received logic block 40) and a gate circuit 60 (represented by gate logic block 60). A pair of contacts, S1 normally open and S2 normally closed, are controlled by coils L3 and L4, respectively. Neither coil is energized; therefore, current from power source 30 is allowed to flow across S2, energizing coil L5 in the gate circuit 60. In turn contact points S3, normally closed, of the gate circuit 60 are opened. Therefore, when a ring signal (90 V AC) arrives at T+, it cannot activate the ringer in telephone 14 across the gate circuit 60. This process is representative of the initialize non-conductive state logic block 17 in FIG. 1.

When the user desires to lift the handset, for example to use the telephone at any time or answer an incoming call, a bypass circuit 36 (represented by off-hook logic block 36) allows the line 12 to be connected to the telephone 14 whether the power 30 is on or off. Hookswitch contacts 16 are normally open. When the power 30 is off and the hookswitch 16 is in an on-hook condition, normal telephone direct current charges a capacitor 31 through the path associated with S3 and diode 33. The charged capacitor 31 prevents current from flowing through the path including resistor 35 and diode 37. Alternate path controlled by a triac 39 is non-conductive because an equal charge is present on both sides of triac 39. Thus, an incoming ring signal will pass through S3 to telephone 14, sounding the ringer.

When the power 30 is on which opens S3 to change gate 60 from conductive to non-conductive, telephone line direct current cannot flow through the path including open S3. Diode 37 and resister 35 prevents sufficient alternating current from crossing this path to sound the ringer. Moreover, when hookswitch 16 is on-hook (open), no direct current flows to activate triac 39 which thus remains nonconductive. However, when the hookswitch 16 is closed, a figure-eight circuit is closed allowing capacitor 31 to discharge across diode controlling triac 39, allowing the triac to become conductive and in turn allowing current to pass to power the telephone 14. The resistor in parallel with the S3 and contacts S10 are unrelated to the function of the logic of the invention and only serve to eliminate unwanted side effects in the system.

With the power 30 on, a first incoming ring signal will trigger the following sequence of events to activate the timing sequences. The ring signal arrives at the ring signal sensor circuit 40, including a capacitor, full wave rectifier 41, and resistor 43. The capacitor in series with the full wave rectifier 41 allows only AC voltage to activate transistor 45. The resistor 43 is chosen to be of sufficient ohms, such as 220 KΩ, so that when the voltage goes high (90 V AC of a ring signal), transistor 45 is activated. Transistor 45 allows current to pass from power source 30 to coil L1 of ring signal sensor circuit 40 when activated.

Coil L1 changes the normally open state of contacts S4 in circuit 40 to a closed state. Current from power source 30 flows through S4 and then through contacts S5 to maintain coil L1 in an energized state.

Block 52 represents a mode selector circuit. When the mode switch as shown in block 52 is closed at position #1 (first ring mode), coil L2 cannot be energized until contacts S6, normally open, are closed. To achieve this end, current passes across a path including S4 (having been closed by L1), S7, and a diode. At this point, two actions occur. First, capacitor 71 associated with a variable resistor 76 (corresponding to delay sequence parameters logic block 76) is charged. Second, transistor 21 is activated, which activates transistor 23, allowing current to flow from power 30 to coil L3. Coil L3 closes S1, maintaining current to coil L5, keeping gate 60 non-conductive; coil L3 also closes contacts S8.

Contacts S8 control the current from power source 30 passing to the window timer circuit 28 (represented by window timer logic block 28). Again two actions occur when current passes across S8. First, capacitor 91 associated with a variable resistor 96 (corresponding to delay sequence parameters logic block 96) is charged. Second, transistor 93 is activated, which activates transistor 95, allowing current to flow from power 30 to coil L4.

Coil L4 now opens S2; S1 is however still closed and provides current to L5 to keep gate 60 non-conductive. Coil L4 closes S6, allowing current to energize coil L2. Coil L2 also opens S7, thus disabling further current from flowing to delay timer circuit 26 when the subsequent ring signals arrive. Finally, coil L4 also opens S5, thus shutting off current to L1, which in turn opens S4. The effect is to shut off power to the delay timer circuit 26 from power source 30. Also, whenever a ring signal is sensed at transistor 45, coil L1 allows current to flow to the visual ring indicator circuit 54 (represented by logic block 54), comprising an LED and resistor.

However, as current is shut off to the delay timer circuit 26 through S7, capacitor 71 begins to discharge. Variable resistor 76 determines the period of discharge until voltage reaches a threshold which deactivates transistors 21,23. During discharge, transistors 21,23 are activated to allow current from power source 30 to energize coil L3. Coil L3 maintains S8 in a closed condition and thus allows current to pass from power source 30 to energize coil L4 and charge capacitor 91. All subsequent associated effects are as described above continue until the discharge of capacitor 71 is complete.

When discharge of capacitor 71 is complete, coil L3 is deenergized. First, contacts S8 return to a normally open condition, in turn allowing capacitor 91 of the window timer circuit 28 to begin to discharge and power the timing circuit associated with variable resistor 96. Second, S1 returns to an open position. At this time both S1 and S2 are open, deenergizing coil L5, which in turn returns S3 to a normally closed position in gate 60. Contacts S9 also return to a closed position, turning on indicator circuit 94, comprising an LED and resistor. Thus, the telephone is enabled by the window timer circuit 28 and remains so until capacitor 91 fully discharges. Such discharge causes coil L4 to deenergize and S2 again returns to a closed position, reenergizing coil L5, causing S3 to again open, disabling the ringer.

When mode switch is in position #2 (last ring mode), the conditions activated are essentially the same as in the first ring mode. Coil L2 is not energized when power 30 is initially turned on because contacts S9, normally closed, are opened when coil L5 is energized. The first ring signal, as discussed before, causes current to pass across a path including S4 (having been closed by L1), S7, and a diode. At this point, as described previously, two actions occur. First, capacitor 71 associated with a variable resistor 76 (corresponding to delay sequence parameters logic block 76) is charged. Second, transistor 21 is activated, which activates transistor 23, allowing current to flow from power 30 to coil L3. Coil L3 closes S1, maintaining current to coil L5, keeping gate 60 non-conductive; coil L3 also closes contacts S8.

Contacts S8 control the current from power source 30 passing to the window timer circuit 28 (represented by window timer logic block 28). Again two actions occur when current passes across S8. First, capacitor 91 associated with a variable resistor 96 (corresponding to delay sequence parameters logic block 96) is charged. Second, transistor 93 is activated, which activates transistor 95, allowing current to flow from power 30 to coil L4. Coil L4 now opens S2; S1 is however still closed and provides current to L5 to keep gate 60 non-conductive. As before, coil L4 opens S5, thus shutting off current to L1, which in turn opens S4. The effect is to shut off power to the delay timer circuit 26 from power source 30. Therefore, as current is shut off to the delay timer circuit 26, capacitor 71 begins to discharge as previously described.

At this point in the path, however, the differing effects between mode #1 and mode #2 appear. Coil L4 does not control contacts which allow energizing of coil L2, and therefore L2 cannot open S7 to break the current path set off by a ring signal. Therefore, as each ring signal arrives, the above described last ring mode sequence is repeated, recharging the capacitor 71 and timing circuit associated with variable resistor 76. The practical effect is to restart the delay timer circuit 26 with each new ring signal, thereby maintaining gate circuit 60 in a continually non-conductive state until the preset time between the last ring and the full discharge of capacitor 71 has passed to start the window timing circuit 28. Only then is gate circuit 60 enabled, as previously described.

Referring now to FIG. 3, an alternative electronic embodiment shows means by which the logic as described above can be executed. Timer circuits 48,50,28 (representing logic blocks 26,26,28 in FIG. 1) include commercially available 556-type timers 27,27 with standard 14 pin circuit connections. Variable resistors 76,76,96 are wired to the appropriate pin to allow a user to set the time period over which each associated timer 27 times. The first ring mode delay timing circuit is wired according to block 48, including a capacitor 123, which, when discharging, powers the timing circuit in a similar manner as described previously. The last ring mode delay timing circuit is wired according to block 50, again including a capacitor 121 to power the timing circuit and further including a capacitor 122 to power the timer associated with pins 8–14. The window timing circuit is wired according to block 28, including a capacitor 125 to power the window timing circuit. Each timing circuit 48,50,28 is initialized through its associated pin (4 or 10) when power source 30 is on.

The gate circuit 60 includes an optical coupler, such as MOC3010 triac output optocoupler, which is conductive only while current, flowing through its associated LED, causes light emission driving the optocoupler.

The gate circuit 60 includes a series of transistors 103, 105,107. Transistor 103 is activated when a ring signal arrives at the ring signal sensor circuit 40 passing through a capacitor, full wave rectifier 41, diode and resistor 43. Transistor 105 is only activated when power 30 is on. Transistor 107 is activated only when the window timer circuit 28 is activated and timing.

When the power 30 is OFF, each of the transistors of the ring signal sensor circuit 40 are also off. Thus, the gate circuit 60 is not energized and non-conductive. However, when the ring signal arrives, the current activates transistor 103 allowing the path associated with the LED of gate circuit 60 to be completed to the negative bus. Thus, at node 110 the telephone ring signal pulse is allowed to pass to the LED of optocoupler 60, placing the gate 60 into the conductive state and allowing the ring signal to pass to sound the ringer of telephone 14.

When the called party desires to lift the handset whether the power 30 is on or off, a bypass circuit 36 (represented by off-hook logic block 36) allows the line 12 to be connected to the telephone 14. Hookswitch contacts 16 are normally open. When the power 30 is off and the hookswitch 16 is in an on-hook condition, normal telephone direct current will not flow. Bypass circuit 36 comprises a resistor and diode path controlling a silicone-controlled rectifier (SCR) 113. The SCR 113 is non-conductive when no current flows. Therefore, an incoming ring signal is unable to pass through the non-conductive SCR 113 to telephone 14 in an on-hook condition; the ring signal must pass through gate 60. However, as soon as the off-hook condition causes hookswitch 16 to close, current is allowed to flow which activates the conductive state of SCR 113 and the phone line is connected.

When the called party turns power source 30 ON, current flows to pin 4, pin 10, and pin 14 of both timers 27,27 and initializes the device 10. Capacitors 121,122,123,125,129 each become charged. Transistor 105 is also activated; thus, when a ring signal arrives at node 111 it seeks the path to ground via transistor 105 and, hence, transistor 103 is not activated. The gate circuit 60 therefore remains non-conductive, disabling the ringer 18.

The called party also chooses either position #1 (first ring mode circuit 48) or position #2 (last ring mode circuit 50) of the mode selector switch circuit 52. The mode selector switch determines which timer provides the required input to the window timer 28 and indicator 74. Although both timers 27 are receiving current from power source 30, only the chosen circuit is thus capable of being triggered. Once triggered, indicator circuit 74 is activated to show that a delay sequence is timing.

Turning the power ON also allows comparator 109 to sense a reference voltage along the path between resistors 114 and 115. When transistor 101 is activated by the ring signal, current is allowed to pass to comparator 109 which senses a change between the reference voltage and the input voltage. When comparator 109 is so activated, a path to both timers 27 (to pin 8 for last ring mode 50 and to pin 6 for first ring mode 48) is thus opened, activating the timer 27 of circuit block 50. Pin 9 sends output to ring indicator 54, causing a visible indication of the incoming ring signal, and to comparator 117, which causes a negative output signal to transistor 119. Activation of transistor 119 allows capacitor 121 to discharge. The practical effect of this sequence is to reset and restart the timer 27.

After the delay timer 27 is started, the delay sequence is then completed in accordance with the input parameters set through the variable resister circuit 76. At the end of the delay sequence, the sudden drop in voltage from pin 5 triggers the window timer circuit 28 through capacitor 129. The window timer circuit 28 is activated; output from pin 9 activates the indicator circuit 94 to show that the window sequence is timing. The output also activates transistor 107 which completes a path to negative for current flowing from power source 30, whereby transistor 105 is deactivated. Thus, as previously described, transistor 103 is enabled so that when the ring signal arrives, the gate circuit 60 is activated and allows the ring signal to pass and sound the telephone ringer.

The window sequence is then completed in accordance with the input parameters set through the variable resister circuit 96. When voltage output of pin 9 goes negative, transistor 107 is deactivated and current is again allowed to be applied to transistor 105, ultimately disabling gate circuit 60 as described above.

It is to be understood that the present invention is not limited to the embodiments described above, but encompasses any and all embodiments within the scope of the following claims.

I claim:
1. A ring-tone muting device for use with a telephone having a telephone ringer, comprising a gate for selectively conducting a ring signal to the telephone ringer, wherein said gate has at least two states, said states including a conductive state and a non-conductive state;

sensing means for determining when an incoming ring signal arrives;

at least one delay timing means, responsive to said sensing means, for beginning a delay sequence being a predetermined period of time after a ring signal is sensed, said delay timing means having at least one mode of operation;

at least one window timing means, responsive to said delay timing means, for beginning a window sequence being a predetermined period of time after said delay sequence is completed;

gate controlling means responsive to said window timing means such that said state of said gate is conductive; and, means for connecting said gate in series between a telephone line and telephone;

whereby a telephone ringer is disabled while the gate is in a non-conductive state and enabled while the gate is in a conductive state; whereby further, said non-conductive state is coincident with the activation of said delay sequence of said delay timing means; and, whereby further, said conductive state is controlled by the deactivation of said delay sequence and coincident with the activation of said window sequence of said window timing means.

2. The ring-tone muting device according to claim 1, wherein said gate is responsive to said delay timing means such that said state of said gate is non-conductive.

3. The ring-tone muting device according to claim 1, further comprising power means for supplying a direct current power source to said ring-muting device.

4. The ring-tone muting device according to claim 1, further comprising off-hook connection means for connecting the telephone line to the telephone when a hookswitch of the telephone is closed, wherein said off-hook connection means is connected in parallel to said gate so that the telephone may be selectively connected to the telephone line without regard to said state of said gate.

5. The ring-tone muting device according to claim 1, wherein said delay timing means includes at least a first ring mode of operation, further comprising means by which said delay sequence is begun after the first ring signal is sensed and said delay sequence is maintained unaffected by subsequent ring signals while said delay sequence is maintained.

6. The ring-tone muting device according to claim 5, wherein said delay timing means includes a last ring mode of operation, further comprising means by which said delay sequence is begun after the first ring signal is sensed and said delay sequence is restarted by each subsequent ring signal until said window sequence is provided by said window timing means; and, a mode selection means for selecting alternatively said last ring mode and said first ring mode.

7. The ring-tone muting device according to claim 1, wherein said delay timing means includes a last ring mode of operation comprising means by which said delay sequence is begun after the first ring signal is sensed and said delay sequence is restarted by each subsequent ring signal until said window sequence is provided by said window timing means.

8. The ring-tone muting device according to claim 1, further comprising user input means for setting said delay sequence of said delay timing means.

9. The ring-tone muting device according to claim 1, further comprising user input means for setting window sequence parameters for said window timing means.

10. The ring-tone muting device according to claim 1, further comprising a visual ring signal indicator responsive to said sensing means for indicating that a ring signal is sensed.

11. The ring-tone muting device according to claim 1, further comprising a visual indicator responsive to said delay timing means for indicating that the delay timing means is providing a delay sequence.

12. The ring-tone muting device according to claim 1, further comprising a visual indicator responsive to said window timing means for indicating that the window timing means is providing a window sequence.

13. A ring-tone muting device for use with a telephone having a telephone ringer, comprising a gate for selectively conducting a ring signal to the telephone ringer, wherein said gate has at least two states, said states including a conductive state and a non-conductive state;

sensing means for determining when an incoming ring signal arrives and a visual ring signal indicator responsive to said sensing means for indicating that a ring signal is sensed;

at least one delay timing means, responsive to said sensing means, for beginning a delay sequence, being a predetermined period of time after a ring signal is sensed, and a visual indicator responsive to said delay timing means for indicating that the delay timing means is providing said delay sequence, said delay timing means having at least one mode of operation including a first ring mode of operation, comprising means by which said delay sequence is begun after the first ring signal is sensed and said delay sequence is maintained unaffected by subsequent ring signals while said delay sequence is maintained, and further including a last ring mode of operation, comprising means by which said delay sequence is begun after the first ring signal is sensed and said delay sequence is restarted by each subsequent ring signal until said window sequence is provided by said window timing means;

a mode selection means for selecting alternatively said last ring mode and said first ring mode;

user input means for setting said delay sequence of said delay timing means;

at least one window timing means, responsive to said delay timing means, for beginning a window sequence, being a predetermined period of time after said delay sequence is completed, and a visual indicator responsive to said window timing means for indicating that the window timing means is providing a window sequence;

user input means for setting window sequence parameters for said window timing means;

gate controlling means, responsive to said delay timing means such that said state of said gate is non-conductive, and further responsive to said window timing means such that said state of said gate is conductive;

means for connecting said gate in series between a telephone line and telephone;

power means for supplying a direct current power source to operate said ring-muting device;

off-hook connection means for connecting the telephone line to the telephone when a hookswitch of the telephone is closed, wherein said off-hook connection means is connected in parallel to said gate so that the telephone may be selectively connected to the telephone line without regard to said state of said gate;

whereby a telephone ringer is disabled while the gate is in a non-conductive state and enabled while the gate is in a conductive state; whereby further, said non-conductive state is coincident with the activation of said delay sequence of said delay timing means; and, whereby further, said conductive state is controlled by the deactivation of said delay sequence and coincident with the activation of said window sequence of said window timing means.

14. A method for muting a ring signal transmitted to a telecommunications system having terminal means operative upon receiving the ring signal, detection means for receiving and detecting the ring signal, and gating means for selectively interrupting transmission of the ring signal to the terminal means wherein said gating means includes at least a means for timing a first periodic interval and a means for timing a second periodic interval, comprising the steps of:

disabling transmission of the ring signal through the gating means;

detecting the ring signal by the detection means;

activating the first periodic interval in response to the ring signal;

terminating the first periodic interval and activating the second periodic interval in response thereto;

enabling transmission of the ring signal to said terminal means through the gating means in response to the activation of the second periodic interval; and, terminating the second periodic interval and disabling the transmission of the ring signal through the gating means in response thereto.

15. A method for muting a ring signal according to claim 14, further including the step of selecting a time interval parameter for the start and end of each first periodic interval and second periodic interval.

16. A method for muting a ring signal according to claim 14, further including the step of restarting the first periodic time interval upon detecting each ring-signal.

* * * * *